(12) United States Patent
Takamitsu et al.

(10) Patent No.: US 10,556,802 B2
(45) Date of Patent: Feb. 11, 2020

(54) METHOD FOR PRODUCING AEI ZEOLITE

(71) Applicant: TOSOH CORPORATION, Yamaguchi (JP)

(72) Inventors: Yasuyuki Takamitsu, Yamaguchi (JP); Tomoya Ishikawa, Yamaguchi (JP); Mitsuaki Yoshimitsu, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 0 days.

(21) Appl. No.: 15/752,460

(22) PCT Filed: Aug. 26, 2016

(86) PCT No.: PCT/JP2016/074922
§ 371 (c)(1),
(2) Date: Feb. 13, 2018

(87) PCT Pub. No.: WO2017/038662
PCT Pub. Date: Mar. 9, 2017

(65) Prior Publication Data
US 2019/0009257 A1 Jan. 10, 2019

(30) Foreign Application Priority Data
Sep. 1, 2015 (JP) .................. 2015-171744

(51) Int. Cl.
*C01B 39/48* (2006.01)
*B01J 29/70* (2006.01)
*C01B 39/02* (2006.01)

(52) U.S. Cl.
CPC ............ *C01B 39/026* (2013.01); *B01J 29/70* (2013.01); *C01B 39/48* (2013.01); *B01J 2229/16* (2013.01); *B01J 2229/18* (2013.01); *B01J 2229/62* (2013.01)

(58) Field of Classification Search
CPC ......... C01B 39/48; C01B 39/026; B01J 29/70
See application file for complete search history.

(56) References Cited

U.S. PATENT DOCUMENTS

| | | | |
|---|---|---|---|
| 4,503,024 A * | 3/1985 | Bourgogne | ......... C01B 33/2869 |
| | | | 423/709 |
| 5,958,370 A | 9/1999 | Zones et al. | |
| 7,008,610 B2 | 3/2006 | Cao et al. | |
| 2005/0197519 A1 | 9/2005 | Cao et al. | |
| 2015/0118150 A1 | 4/2015 | Yang et al. | |
| 2015/0151285 A1 | 6/2015 | Rivas-Cardona et al. | |
| 2016/0144347 A1 | 5/2016 | Sano et al. | |

FOREIGN PATENT DOCUMENTS

| | | |
|---|---|---|
| CN | 1898158 A | 1/2007 |
| EP | 74900 A2 | 3/1983 |
| JP | 2015-134698 A | 7/2016 |
| WO | 2005063624 A1 | 7/2005 |
| WO | 2015/063501 A1 | 5/2015 |
| WO | 2015/084834 A1 | 6/2015 |

OTHER PUBLICATIONS

Manuel Moliner et al. "Cu-SSZ-39, an active and hydrothermally stable catalyst for the selective catalytic reduction of NOx", Chem. Commun, 48, 2012, pp. 8264-8266.
Paul Wagner et al., "Guest/Host Relationships in the Synthesis of the Novel Cage-Based Zeolites SSZ-36 and SSZ-39", J.Am.Chem. Soc., 2000, pp. 263-273, vol. 122.
Toshihiro Maruo et al. "Facile Synthesis of AEI Zeolites by Hydrothermal Conversion of FAU Zeolites in the Presence of Tetraethylphosphonium Cations", Chemistry Letters, 43, 2014, pp. 302-304.
Naoto Nakazawa et al., "Direct synthesis of high-silica SSZ-39", with English Translation, Graduate School of Engineering, Yokohama National University, Nov. 26, 2014, pp. 13, vol. 30.
Nuria Martin et al., "Efficient synthesis of the Ci-SSZ-39 catalyst for DeBOx applications", Chem. Commun., 51, 2015, pp. 11030-11033.
International Search Report from Patent Application No. PCT/JP2106/074922, dated Sep. 27, 2016.

\* cited by examiner

*Primary Examiner* — David M Brunsman
(74) *Attorney, Agent, or Firm* — Greenblum & Bernstein, P.L.C.

(57) ABSTRACT

Provided is a method for producing an AEI zeolite without the use of a zeolite Y and a raw material containing fluorine and phosphorus, the method including a crystallization step of crystallizing a composition containing a structure directing agent, a sodium source, water, and a zeolite having at least one of the following structures as a silica alumina source.

12 Claims, No Drawings

METHOD FOR PRODUCING AEI ZEOLITE

This is a 371 national stage filing of PCT/JP2016/074922, filed Aug. 26, 2016.

TECHNICAL FIELD

The present invention relates to a method for producing an AEI zeolite.

BACKGROUND ART

An AEI zeolite is a crystalline aluminosilicate that has been studied as a catalyst for olefin production and a catalyst for selective catalytic reduction (a so-called SCR catalyst) (e.g. Patent Document 1 and Non-Patent Document 1). Until now, the following production methods have been reported as methods for producing an AEI zeolite using a zeolite Y as a raw material.

Patent Document 1 discloses a method for producing an AEI zeolite, the method including crystallizing a raw material containing a zeolite Y, sodium silicate, and 1,1-diethyl-2,6-dimethylpiperidinium cation. It is disclosed that the production method according to Patent Document 1 takes 5 to 7 days for the crystallization to obtain the AEI zeolite.

Non-Patent Document 1 discloses a method for producing SSZ-39, the method including crystallizing a raw material containing sodium silicate, a USY zeolite, and a 1,1,3,5-tetramethylpiperidinium cation. It is disclosed that the production method according to Non-Patent Document 1 takes 7 days for the crystallization to obtain the AEI zeolite. Furthermore, Non-Patent Document 1 discloses that the AEI zeolite can be obtained only when the USY zeolite and the sodium silicate are used as the raw material.

Non-Patent Document 2 discloses that SSZ-39 is obtained only when a certain structure directing agent and a zeolite Y, in which the $SiO_2/Al_2O_3$ ratio of the raw material is 30, are used. Non-Patent Document 2 discloses that AEI zeolite is not obtained even in the case where a mixture containing a zeolite Y is crystallized if the molar ratio of $SiO_2/Al_2O_3$ is not 30.

Non-Patent Document 3 describes a method for producing an AEI zeolite, the method including crystallizing a raw material containing a Zeolite Y and a tetraethylphosphonium cation. It is disclosed that the production method according to Non-Patent Document 3 takes 1 day for the crystallization to obtain the AEI zeolite.

Non-Patent Document 4 discloses a method for producing SSZ-39, the method including crystallizing a raw material containing a colloidal silica, a Zeolite Y, and a 1,1,3,5-tetramethylpiperidinium cation. It is disclosed that the production method according to Non-Patent Document 4 takes 66 hours or longer for the crystallization to obtain the AEI zeolite.

Non-Patent Document 5 discloses a method for producing SSZ-39, the method including crystallizing a raw material containing a USY zeolite and a 1,1,3,5-tetramethylpiperidinium cation. It is disclosed that the production method according to Non-Patent Document 5 takes 7 days for the crystallization to obtain the AEI zeolite.

Furthermore, Non-Patent Document 5 discloses a method for producing SSZ-39, the method including crystallizing a raw material containing a USY zeolite, a copper-polyamine complex, and a 1,1,3,5-tetramethylpiperidinium cation. The crystallization time is not described.

Patent Document 2 discloses a method for producing an AEI zeolite having the molar ratio of silica to alumina of greater than 100 by using an alumina source except a zeolite Y. The method disclosed in Patent Document 2 includes crystallizing a raw material containing aluminum nitrate, tetraethyl orthosilicate, and 1,1-diethyl-2,6-dimethylpiperidinium cation in a system containing hydrogen fluoride.

CITATION LIST

Patent Literature

Patent Document 1: U.S. Pat. No. 5,958,370
Patent Document 2: U.S. Pat. No. 7,008,610

Non-Patent Literature

Non-Patent Document 1: Chemical Communication Vol. 48, p. 8264-8266 (2012)
Non-Patent Document 2: Journal of American Chemical Society, No. 122, p. 263-273 (2000)
Non-Patent Document 3: Chemistry Letters, No. 43, p. 302-304 (2014)
Non-Patent Document 4: 30th Zeolite Conference, A5 (2014)
Non-Patent Document 5: Chemical Communication Vol. 51, p. 11030-11033 (2015)

SUMMARY OF INVENTION

Technical Problem

By methods for producing an AEI zeolite that have been disclosed, especially by methods for producing an AEI zeolite having the proportion of the silica to the alumina of 100 or less, production was not possible by using a raw material except zeolite Y. Furthermore, a method for producing an AEI zeolite using a zeolite Y takes a long time for crystallization, in addition to high production cost due to the use of an expensive zeolite Y. Therefore, these production methods exhibited significantly low productivity and has been difficult to be employed as industrial methods for producing AEI zeolites.

Furthermore, in Patent Document 2 and Non-Patent Document 3, the crystallization of the AEI zeolite is possible in a relatively short time period. However, these production methods require the use of a raw material containing fluorine or phosphorus. The fluorine and the phosphorus are, needless to say, contained in the AEI zeolite and also contained in wastewater and the like, after the production of the AEI zeolite. Therefore, additional treatment such as wastewater treatment and equipment are required, and the production cost of an AEI zeolite is increased. Therefore, to crystallize the AEI zeolite in a short period of time, use of a special compound, such as fluorine and phosphorus, has been required. Furthermore, because the method for producing an AEI zeolite of Patent Document 2 uses fluorine having high corrosivity, a typical production facility for zeolite cannot be used.

In light of these problems, an object of the present invention is to provide a method for producing an AEI zeolite without the use of a zeolite Y and a raw material containing fluorine and phosphorus. Furthermore, another object of the present invention is to provide a method for producing an AEI zeolite with high productivity compared to the productivities of known methods for producing an AEI zeolite. Furthermore, yet another object of the present invention is to provide an industrial method for producing an AEI zeolite, especially an industrial method for producing an AEI zeolite having the molar ratio of the silica to the alumina of 100 or less.

Solution to Problem

The inventors of the present invention studied industrial methods for producing an AEI zeolite. As a result, the inventors found that the crystalline aluminosilicate except zeolite Y can be used as the silica alumina source of the AEI zeolite. Furthermore, the inventors also found that, by using a particular zeolite as the silica alumina source, the AEI zeolite can be crystallized without the use of a zeolite Y and in a shorter period of time compared to a known method for producing an AEI zeolite.

That is, the gist of the present invention is as follows.

(1) A method for producing an AEI zeolite, the method including a crystallization step of crystallizing a composition containing a structure directing agent, a sodium source, water, and, a zeolite having at least one of the following structures as a silica alumina source.

TABLE 1

| ABW | ACO | AEN | AFN | AFR | AFS | AFT | AFV | AFX | AFY |
|---|---|---|---|---|---|---|---|---|---|
| ANA | APC | APD | ATN | ATT | ATV | AVL | AWO | AWW | BCT |
| BIK | BOZ | BPH | BRE | CAS | CDO | CGF | CGS | -CLO | CSV |
| CZP | DAC | DDR | DFO | DFT | EAB | EDI | EEI | EON | EPI |
| ERI | ESV | ETR | EZT | FER | GIS | GME | GOO | HEU | IFW |
| IFY | IHW | IRN | ITE | ITW | IWW | JBW | JNT | JOZ | JSN |
| JSW | KFI | -LIT | LOV | LTA | LTF | LTJ | LTL | LTN | MAZ |
| MEL | MER | MFS | MON | MOR | MOZ | MTF | NAB | NAT | NPT |
| NSI | OBW | OSO | OWE | -PAR | PAU | PCR | PHI | PSI | PUN |
| RHO | RRO | RSN | RTE | RTH | RWR | RWY | SAS | SAT | SAV |
| SBE | SBN | SBS | SBT | SFO | *SFV | SFW | SIV | SOS | STI |
| STW | SZR | THO | TSC | TUN | UEI | UFI | UOS | UOV | VET |
| VNI | VSV | WEI | -WEN | YUG | ZON | | | | |

(2) The method according to (1) above, where the silica alumina source is a zeolite having at least one structure selected from the group consisting of ERI, FER, HEU, and MOR.

(3) The method according to (1) or (2) above, where a molar ratio of silica to alumina of the zeolite is from 10 to 100.

(4) The method according to any one of (1) to (3) above, where the structure directing agent is at least one selected from the group consisting of 1,1,3,5-tetramethylpiperidinium cation, 1,1-diethyl-2,6-dimethylpiperidinium cation, 1,1,2,6-tetramethylpiperidinium cation, 1-ethyl-1,2,6-trimethylpiperidinium cation, and 1,1,2-triethylpiperidinium cation.

(5) The method according to any one of (1) to (4) above, where the composition contains at least one selected from the group consisting of aluminum hydroxide, aluminum oxide, aluminum sulfate, aluminum chloride, aluminum nitrate, amorphous aluminosilicate, metallic aluminum, and aluminum alkoxide.

(6) The method according to any one of (1) to (5) above, where the composition contains an amorphous aluminosilicate having a molar ratio of silica to alumina of 1.4 to 2000.

(7) The method according to any one of (1) to (6) above, where the composition contains at least one selected from the group consisting of an AEI zeolite, a CHA zeolite, an OFF zeolite, an ERI zeolite, a KFI zeolite, an AFX zeolite, an AFT zeolite, an EAB zeolite, a GME zeolite, and an LEV zeolite.

(8) The method according to any one of (1) to (7) above, where a molar ratio of silica to alumina of the source composition is from 15 to 50.

(9) The method according to any one of (1) to (8) above, where the composition has a molar composition described below, where M is an alkali metal except sodium and SDA is an organic structure directing agent:
$SiO_2/Al_2O_3$ ratio: from 20 to 50;
$Na/SiO_2$ ratio: from 0.05 to 0.3;
$M/SiO_2$ ratio: from 0 to 0.5;
$SDA/SiO_2$ ratio: from 0.1 to 0.3;
$OH/SiO_2$ ratio: from 0.1 to 0.45; and
$H_2O/SiO_2$ ratio: 3 or greater but less than 20.

(10) The method according to any one of (1) to (9) above, where a fluorine content in the composition is 100 ppm by weight or less.

(11) The method according to any one of (1) to (10) above, where an AEI zeolite having a molar ratio of silica to alumina of 100 or less is obtained in the crystallization step.

Advantageous Effects of Invention

According to the present invention, a method for producing an AEI zeolite with high productivity compared to productivity of a known method for producing an AEI zeolite without substantially using a raw material containing fluorine or phosphorus can be provided. Furthermore, the present invention can provide an industrial method for producing an AEI zeolite, especially an industrial method for producing an AEI zeolite having a molar ratio of silica to alumina of 100 or less. Furthermore, because the production method according to an embodiment of the present invention can produce an AEI zeolite by inducing a structural transformation of a zeolite having a structure except a FAU structure, the AEI zeolite can be produced without the use of an expensive zeolite Y.

DESCRIPTION OF EMBODIMENTS

The method for producing an AEI zeolite according to an embodiment of the present invention is described below in detail.

The present invention relates to a method for producing an AEI zeolite. An AEI zeolite is a zeolite having an AEI structure and particularly an aluminosilicate having an AEI structure.

The aluminosilicate has a structure composed of repeating network of aluminum (Al) and silicon (Si) via oxygen (O).

An AEI structure is a structure resulting in an AEI-type composition according to the IUPAC structure code (hereinafter, also simply referred to as "structure code") prescribed by the Structure Commission of the International Zeolite Association.

The crystal phase of the AEI zeolite can be identified by comparing with a powder X-ray diffraction (hereinafter, referred to as "XRD") pattern described in Collection of simulated XRD powder patterns for zeolites, fifth revised edition, p. 23 (2007) or with an XRD pattern described for AEI in Zeolite Framework Types on the website of the Structure Commission of the International Zeolite Association, http://www.iza-structure.org/databases/.

An example of the AEI zeolite obtained according to an embodiment of the production method of the present invention is SSZ-39.

The production method according to an embodiment of the present invention includes a method for producing an AEI zeolite, the method including a crystallization step of crystallizing a composition containing a structure directing agent, a sodium source, water, and a zeolite having at least one of the following structures as a silica alumina source.

Examples of the preferred raw material zeolite include zeolites having at least one structure selected from the group consisting of ABW, ACO, AEN, AFN, AFR, AFS, AFV, AFY, ANA, APC, APD, ATN, ATT, ATV, AVL, AWO, AWW, BCT, BIK, BOZ, BPH, BRE, CAS, CDO, CGF, CGS, -CLO, CSV, CZP, DAC, DDR, DFO, DFT, EDI, EEI, EON, EPI, ESV, ETR, EZT, FER, GIS, GOO, HEU, IFW, IFY, IHW, IRN, ITE, ITW, IWW, JBW, JNT, JOZ, JSN, JSW, KFI, -LIT, LOV, LTA, LTF, LTJ, MAZ, MEL, MER, MFS, MON, MOR, MTF, NAB, NAT, NPT, NSI, OBW, OSO, OWE, -PAR, PAU, PCR, PHI, PSI, PUN, RHO, RRO, RSN, RTE, RTH, RWR, RWY, SAS, SAV, SBE, SBN, SBS, SBT, SFO, *SFV, SFW, SIV, SOS, STI, STW, THO, TSC, TUN, UEI, UFI, UOS, UOV, VET, VNI, VSV, WEI, YUG, and ZON.

TABLE 2

| ABW | ACO | AEN | AFN | AFR | AFS | AFT | AFV | AFX | AFY |
|-----|-----|-----|-----|-----|-----|-----|-----|-----|-----|
| ANA | APC | APD | ATN | ATT | ATV | AVL | AWO | AWW | BCT |
| BIK | BOZ | BPH | BRE | CAS | CDO | CGF | CGS | -CLO | CSV |
| CZP | DAC | DDR | DFO | DFT | EAB | EDI | EEI | EON | EPI |
| ERI | ESV | ETR | EZT | FER | GIS | GME | GOO | HEU | IFW |
| IFY | IHW | IRN | ITE | ITW | IWW | JBW | JNT | JOZ | JSN |
| JSW | KFI | -LIT | LOV | LTA | LTF | LTJ | LTL | LTN | MAZ |
| MEL | MER | MFS | MON | MOR | MOZ | MTF | NAB | NAT | NPT |
| NSI | OBW | OSO | OWE | -PAR | PAU | PCR | PHI | PSI | PUN |
| RHO | RRO | RSN | RTE | RTH | RWR | RWY | SAS | SAT | SAV |
| SBE | SBN | SBS | SBT | SFO | *SFV | SFW | SIV | SOS | STI |
| STW | SZR | THO | TSC | TUN | UEI | UFI | UOS | UOV | VET |
| VNI | VSV | WEI | -WEN | YUG | ZON | | | | |

Each structure in the table above is a structure of zeolite and is a structure corresponding to the IUPAC structure code (hereinafter, also simply referred to as "structure code") prescribed by the Structure Commission of the International Zeolite Association.

By this, an AEI zeolite, an AEI zeolite having the molar ratio of silica to alumina (hereinafter, also referred to as "$SiO_2/Al_2O_3$ ratio") of 100 or less, an AEI zeolite having the $SiO_2/Al_2O_3$ ratio of 50 or less, or an AEI zeolite having the $SiO_2/Al_2O_3$ ratio of 40 or less, can be obtained without inducing a structural transformation of a zeolite having a Y-structure.

The source composition contains a zeolite having at least one of the following structures (hereinafter, also referred to as "raw material zeolite") as a silica alumina source. By allowing the source composition to contain the raw material zeolite, the AEI zeolite can be crystallized from the crystalline aluminosilicate without inducing a structural transformation of a zeolite Y, and the crystallization time of the AEI zeolite can be shortened compared to a known method for producing an AEI zeolite.

The zeolite Y and the AEI zeolite each contain a double 6-membered ring (D6R) in the framework. A known method for producing an AEI zeolite by inducing a structural transformation of a zeolite, suggests that the AEI zeolite is crystallized due to the presence of the D6R. On the other hand, the raw material zeolite in an embodiment of the present invention may be a zeolite having no double 6-membered ring (D6R) in the framework. Examples of the raw material zeolite having no D6R in the framework include zeolites having at least one structure selected from the group consisting of ABW, ACO, AEN, AFN, AFR, AFS, AFY, ANA, APC, APD, ATN, ATT, ATV, AWO, AWW, BCT, BIK, BOZ, BPH, BRE, CAS, CDO, CGF, CGS, -CLO, CSV, CZP, DAC, DDR, DFO, DFT, EDI, EEI, EON, EPI, ESV, ETR, EZT, FER, GIS, GOO, HEU, IFW, IFY, IHW, IRN, ITE, ITW, IWW, JBW, JNT, JOZ, JSN, JSW, KFI, -LIT, LOV, LTA, LTF, LTJ, MAZ, MEL, MER, MFS, MON, MOR, MTF, NAB, NAT, NPT, NSI, OBW, OSO, OWE, -PAR, PAU, PCR, PHI, PSI, PUN, RHO, RRO, RSN, RTE, RTH, RWR, RWY, SAS, SAV, SBE, SBN, SFO, *SFV, SIV, SOS, STI, STW, THO, TUN, UEI, UFI, UOS, UOV, VET, VNI, VSV, WEI, YUG, and ZON.

TABLE 3

| ABW | ACO | AEN | AFN | AFR | AFS | AFT | AFV | AFX | AFY |
|-----|-----|-----|-----|-----|-----|-----|-----|-----|-----|
| ANA | APC | APD | ATN | ATT | ATV | AVL | AWO | AWW | BCT |
| BIK | BOZ | BPH | BRE | CAS | CDO | CGF | CGS | -CLO | CSV |
| CZP | DAC | DDR | DFO | DFT | EAB | EDI | EEI | EON | EPI |
| ERI | ESV | ETR | EZT | FER | GIS | GME | GOO | HEU | IFW |
| IFY | IHW | IRN | ITE | ITW | IWW | JBW | JNT | JOZ | JSN |
| JSW | KFI | -LIT | LOV | LTA | LTF | LTJ | LTL | LTN | MAZ |
| MEL | MER | MFS | MON | MOR | MOZ | MTF | NAB | NAT | NPT |
| NSI | OBW | OSO | OWE | -PAR | PAU | PCR | PHI | PSI | PUN |
| RHO | RRO | RSN | RTE | RTH | RWR | RWY | SAS | SAT | SAV |
| SBE | SBN | SBS | SBT | SFO | *SFV | SFW | SIV | SOS | STI |
| STW | SZR | THO | TSC | TUN | UEI | UFI | UOS | UOV | VET |
| VNI | VSV | WEI | -WEN | YUG | ZON | | | | |

An AEI zeolite is obtained by using these zeolites as alumina silica sources and, furthermore, the crystallization time thereof is shortened. One of the reasons thereof is that the raw material zeolite tends to induce a framework unit of the AEI structure, compared to the case of the zeolite Y.

The raw material zeolite is preferably a zeolite having at least one structure selected from the group consisting of ERI, FER, HEU, and MOR, more preferably at least one selected from the group consisting of an ERI zeolite, a FER zeolite, a HEU zeolite, and an MOR zeolite, and even more preferably at least one selected from the group consisting of an FER zeolite, a HEU zeolite, and an MOR zeolite. By using these zeolites as the raw material zeolites, the yield of the AEI zeolite is increased, and the crystallization of the AEI zeolite is more easily proceeded.

Examples of the particularly preferable raw material zeolite in an embodiment of the present invention include at least one of an FER zeolite or an MOR zeolite. Furthermore, the particularly preferable raw material zeolite is an FER zeolite. The FER zeolite and the MOR zeolite have significantly wide ranges of the $SiO_2/Al_2O_3$ ratios to crystallize themselves. Therefore, the FER zeolite and the MOR zeolite having the $SiO_2/Al_2O_3$ ratios of 10 to 300, 10 to 100, or 10 to 50, can be directly obtained by the crystallization. On the other hand, the zeolite Y has a narrower range of the $SiO_2/Al_2O_3$ ratio to crystallize itself, and the crystallization is possible only when a zeolite Y has the $SiO_2/Al_2O_3$ ratio of approximately 3 to 6.

When the zeolite Y is used as a raw material for an AEI zeolite, an additional pretreatment, such as dealumination treatment, is required to increase the $SiO_2/Al_2O_3$ ratio. Such a pretreatment raises the cost of the raw material zeolite as well as the production cost of the AEI zeolite. Furthermore, in a zeolite that has been undergone dealumination treatment, aluminum remains outside the framework. The aluminum located outside the framework tends to inhibit crystallization of a zeolite. On the other hand, the FER zeolite and the MOR zeolite, which do not require dealumination treatment and the like, can be used as more inexpensive silica alumina sources to produce an AEI zeolite. Because of this, the production method according to an embodiment of the present invention is a method that is industrially applied easily.

An example of the $SiO_2/Al_2O_3$ ratio of the raw material zeolite is 10 to 300. In the present invention, the $SiO_2/Al_2O_3$ ratio of the raw material zeolite contained in the source composition is preferably from 10 to 100, more preferably from 10 to 50, even more preferably from 14 to 50, and yet even more preferably from 14 to 35.

An FER zeolite and an MOR zeolite having wide ranges of the $SiO_2/Al_2O_3$ ratios exist. Therefore, the source composition may contain at least two of FER zeolites and/or MOR zeolites having $SiO_2/Al_2O_3$ ratios that are different each other as the silica alumina sources.

The raw material zeolite may be of any cation type. Examples of the cation type of raw material zeolite include at least one selected from the group consisting of a sodium type (Na type) a proton type ($H^+$ type), and an ammonium type ($NH_4$ type). Furthermore, the cation type is exemplified by a proton type.

The source composition may contain another alumina source or silica source except the raw material zeolite.

Examples of the alumina source except the raw material zeolite include at least one selected from the group consisting of aluminum hydroxide, aluminum oxide, aluminum sulfate, aluminum chloride, aluminum nitrate, amorphous aluminosilicate, metallic aluminum, and aluminum alkoxide. From the industrial perspective, the alumina source except the raw material zeolite is preferably at least one selected from the group consisting of aluminum hydroxide, aluminum oxide, aluminum sulfate, aluminum chloride, amorphous aluminosilicate, and metallic aluminum, more preferably at least one selected from the group consisting of aluminum hydroxide, aluminum oxide, aluminum sulfate, aluminum chloride, and amorphous aluminosilicate, even more preferably at least one selected from the group consisting of aluminum oxide, aluminum sulfate, aluminum chloride, and amorphous aluminosilicate, and yet even more preferably an amorphous aluminosilicate.

The silica source except the raw material zeolite is preferably at least one selected from the group consisting of silica sol, fumed silica, colloidal silica, precipitated silica, amorphous silicate, and amorphous aluminosilicate, and more preferably at least one selected from the group consisting of amorphous silicate and amorphous aluminosilicate.

When the source composition contains amorphous aluminosilicate, the amorphous aluminosilicate preferably has the silica content of greater than 43 wt. % (greater than 20 wt. % in terms of the silica content). Examples of the amorphous aluminosilicate having the silica content of greater than 43 wt. % include amorphous aluminosilicates having the $SiO_2/Al_2O_3$ ratio of 1.4 to 2000, 1.4 to 100, 1.4 to 50, or 20 to 50.

The content of the raw material zeolite in the source composition determined by the following equation is preferably 20 wt. % or greater, and more preferably 30 wt. % or greater. The silica alumina source in the source composition may be only the raw material zeolite, that is, the content of the raw material zeolite may be 100 wt. %. Meanwhile, the source composition may contain a silica source or an alumina source except the raw material zeolite. In this case, the content of the raw material zeolite is less than 100 wt. %, and is 95 wt. % or less, 60 wt. % or less, or 50 wt. % or less. When the source composition contains a silica source or an alumina source except the raw material zeolite, the raw material zeolite content in the source composition is from 20 wt. % to 50 wt. %, or from 30 wt. % to 50 wt. %.

In the present invention, the content of the raw material zeolite can be determined from the following equation.

Content of raw material zeolite(wt. %)=(total weight of Al and Si in raw material zeolite)/(total weight of Al and Si of source composition)× 100

In the equation above, the total weight of Al and Si is the total weight obtained by converting the Al in terms of $Al_2O_3$ and converting the Si in terms of $SiO_2$. Therefore, when the source composition contains Si and/or Al in addition to the raw material zeolite, the total weight of the Al and the Si in the source composition is the total of the weight of the Al and the Si contained in the raw material zeolite and the weight of the Al and the Si except those in the raw material zeolite.

Besides the raw material zeolite, the source composition may contain at least one selected from the group consisting of an AEI zeolite, a CHA zeolite, an OFF zeolite, an ERI zeolite, a KFI zeolite, an AFX zeolite, an AFT zeolite, an EAB zeolite, a GME zeolite, and an LEV zeolite (hereinafter, also referred to as "seed crystal zeolite"), may contain at least one of a CHA zeolite or an AEI zeolite, or may contain a CHA zeolite. These zeolites function as seed crystals of the AEI zeolite. By allowing a small amount of the CHA zeolite to be contained in the source composition, generation of the crystalline aluminosilicate except the AEI zeolite, such as an ANA zeolite, tends to be further suppressed.

The content of these zeolites (seed crystal zeolites) needs to be a sufficiently small amount relative to the amount of the raw material zeolite, and the content of the seed crystal zeolite needs to be less than the content of the raw material zeolite in the source composition. The content of the seed crystal zeolite needs to be from 0 wt. % to 30 wt. %, from 0.01 wt. % to 10 wt. %, or from 0.1 wt. % to 3 wt. %, in terms of the weight proportion of the total weight of Al and Si in the seed crystal zeolite, obtained by converting the Al in terms of $Al_2O_3$ and converting the Si in terms of $SiO_2$, relative to the total weight of Al and Si in the source composition, obtained by converting the Al in terms of $Al_2O_3$ and converting the Si in terms of $SiO_2$.

The seed crystal zeolite has a function to induce generation of nucleus of the AEI zeolite. However, in an embodiment of the present invention, the AEI zeolite can be efficiently obtained even when the generation of nucleus induced by the seed crystal zeolite is little. Therefore, in the source composition, the content of the seed crystal zeolite is not greater than the content of the raw material zeolite, and the content of the seed crystal zeolite is preferably 15 wt. % or less, more preferably from 0.1 wt. % to 15 wt. %, even more preferably from 0.1 wt. % to 11 wt. %, and yet even more preferably 0.1 wt. % or greater but less than 5 wt. %.

The average particle size of the seed crystal zeolite could be from 0.5 µm to 5 µm, from 0.5 µm to 4 µm, or from 0.85 µm to 4 µm.

For the structure directing agent (hereinafter, also referred to as "SDA"), a publicly known compound as a compound that directs the AEI zeolite can be used. Examples of the SDA contained in the source composition is at least one selected from the group consisting of 1,1,3,5-tetramethylpiperidinium cation, 1,1-diethyl-2,6-dimethylpiperidinium cation, 1,1,2,6-tetramethylpiperidinium cation, 1-ethyl-1,2,6-trimethylpiperidinium cation, and 1,1,2-triethylpiperidinium cation, is at least one of 1,1,3,5-tetramethylpiperidinium cation and/or 1,1-diethyl-2,6-dimethylpiperidinium cation, or is 1,1,3,5-tetramethylpiperidinium cation.

The SDA needs to be in a form of a salt of the cation described above, and is at least one selected from the group consisting of hydroxides, chlorides, bromides, and iodides of the cations described above, or, furthermore, is at least one selected from the group consisting of hydroxides, chlorides, and bromides of the cations described above.

Examples of the sodium source include compounds containing sodium and, particularly, sodium compounds exhibiting basicity. By allowing the source composition to contain sodium, the structural transformation from the source zeolite to an AEI zeolite is promoted. Specific examples of the sodium source include at least one selected from the group consisting of sodium hydroxide, sodium carbonate, sodium chloride, sodium nitrate, sodium bromide, sodium iodide, and sodium sulfate, and more specifically sodium hydroxide is exemplified. Furthermore, the sodium contained in other raw material in the source composition can be used as the sodium source.

The source composition preferably contains a compound containing an alkali metal except sodium (hereinafter, also referred to as "alkali metal source"). By allowing the alkali metal source to be contained, production of crystalline aluminosilicate having a structure except the AEI zeolite as a byproduct tends to be suppressed. The alkali metal source is a compound containing an alkali metal except sodium, a compound containing at least one selected from the group consisting of potassium, rubidium, and cesium, or a hydroxide containing at least one selected from the group consisting of potassium, rubidium, and cesium.

Due to its industrial availability, the alkali metal source is preferably a compound containing potassium, and is more preferably at least one selected from the group consisting of potassium hydroxide, potassium carbonate, potassium chloride, potassium iodide, and potassium bromide. Due to its industrial availability and relatively low cost, the alkali metal source is preferably potassium hydroxide. Furthermore, when the silica source or the alumina source contains alkali metal except sodium, the alkali metal may also serve as an alkali metal source.

The source composition contains water. The water contained in the source composition could be distilled water, deionized water, or pure water. Furthermore, the water may be water derived from other components contained in the source composition, such as the alumina source and the silica source.

The $SiO_2/Al_2O_3$ ratio of the source composition is preferably from 10 to 100, and more preferably from 15 to 50. The $SiO_2/Al_2O_3$ ratio of the obtained AEI zeolite becomes lower than the $SiO_2/Al_2O_3$ ratio of the source composition. By setting the $SiO_2/Al_2O_3$ ratio of the source composition to 100 or less, an AEI zeolite having the $SiO_2/Al_2O_3$ ratio of 100 or less can be obtained more easily. Examples of the more preferable $SiO_2/Al_2O_3$ ratio include from 15 to 50, from 15 to 40, from 15 to 38, and from 20 to 28.

The molar ratio of the sodium to the silica in the source composition (hereinafter, also referred to as "Na/$SiO_2$ ratio") is preferably from 0.01 to 1.0, more preferably from 0.05 to 1.0, and even more preferably from 0.1 to 0.6. Examples of the particularly preferable range of the Na/$SiO_2$ ratio include 0.05 or greater but less than 0.3, from 0.05 to 0.2, and from 0.05 to 0.18.

The molar ratio of the alkali metal except sodium to the silica in the source composition (hereinafter, also referred to as "M/$SiO_2$ ratio") affects the crystallization time and needs to be from 0 to 0.5, 0 or greater but less than 0.3, from 0 to 0.1, or from 0 to 0.05.

Meanwhile, by allowing the source composition to contain an alkali metal except sodium, generation of crystalline aluminosilicate except the AEI zeolite can be further suppressed. Therefore, the M/$SiO_2$ ratio could be greater than 0 but 0.5 or less, greater than 0 but less than 0.3, greater than 0 but 0.1 or less, or greater than 0 but 0.06 or less.

When the source composition contains an alkali metal except sodium (M) and sodium, the preferable range of the molar ratio of the alkali metal to the silica in the source composition (hereinafter, also referred to as "(M+Na)/$SiO_2$ ratio") is from 0.1 to 0.6, 0.1 or greater but less than 0.3, and from 0.1 to 0.25.

The molar ratio of the alkali metal except sodium to the sodium in the source composition (hereinafter, also referred to as "M/Na ratio") needs to be from 0 to 2.0. When the source composition contains an alkali metal source, an example of the M/Na ratio is greater than 0 but 1.0 or less. The proportion of the alkali metal except sodium is preferably not greater than the proportion of the sodium, and an example of the M/Na ratio is from 0.05 to 1.0.

The molar ratio of the SDA to the silica in the source composition (hereinafter, also referred to as "SDA/$SiO_2$ ratio") is preferably 0.05 or greater. To further promote the crystallization of the AEI zeolite, the SDA/$SiO_2$ ratio is preferably 0.10 or greater. The SDA is preferably in a small amount, and the SDA/$SiO_2$ ratio is preferably 0.5 or less, more preferably 0.40 or less, and even more preferably 0.30 or less from the perspective of reducing the production cost. The SDA/SiO$_2$ ratio of the source composition is preferably from 0.05 to 0.40, more preferably from 0.10 to 0.30, and even more preferably from 0.10 to 0.20 from the perspective of efficiency of the crystallization and the production cost of the AEI zeolite.

The molar ratio of the hydroxide ion (OH) relative to the silica of the source composition (hereinafter, also referred to as "OH/SiO$_2$ ratio") is preferably 0.5 or less, more preferably 0.45 or less, and even more preferably 0.4 or less. When the OH/SiO$_2$ ratio is 0.5 or less, the AEI zeolite can be obtained in a higher yield. The OH/SiO$_2$ ratio of the source composition needs to be 0.1 or greater, or 0.2 or greater. An example of the particular preferable range of the OH/SiO$_2$ ratio is from 0.2 to 0.4.

Examples of the molar ratio of water to silica of the source composition (hereinafter, also referred to as "H$_2$O/SiO$_2$ ratio") include from 3 to 50, from 5 to 50, and from 5 to 25. By setting the H$_2$O/SiO$_2$ ratio to this range, the AEI zeolite is more easily crystallized.

The H$_2$O/SiO$_2$ ratio is preferably 3 or greater but less than 20, more preferably 5 or greater but less than 20, even more preferably from 5 to 15, and yet even more preferably from 7 to 13, to crystallize the AEI zeolite in a shorter period of time.

The following molar composition may be cited as a preferred composition of the source composition. Each ratio in the following composition is a molar (mol) ratio, where M is an alkali metal except sodium and SDA is an organic structure directing agent.

SiO$_2$/Al$_2$O$_3$ ratio: from 10 to 100
Na/SiO$_2$ ratio: from 0.05 to 1.0
M/SiO$_2$ ratio: from 0 to 0.5
SDA/SiO$_2$ ratio: from 0.1 to 0.5
OH/SiO$_2$ ratio: from 0.1 to 0.5
H$_2$O/SiO$_2$ ratio: 3 or greater but less than 20

The following may be cited as a more preferred composition of the source composition.

SiO$_2$/Al$_2$O$_3$ ratio: from 20 to 50
Na/SiO$_2$ ratio: from 0.05 to 0.3
M/SiO$_2$ ratio: from 0 to 0.5
SDA/SiO$_2$ ratio: from 0.1 to 0.3
OH/SiO$_2$ ratio: from 0.1 to 0.45
H$_2$O/SiO$_2$ ratio: 3 or greater but less than 20

The composition of the source composition needs to have a composition formed from any combination of the ranges of the SiO$_2$/Al$_2$O$_3$ ratio, the SDA/SiO$_2$ ratio, the Na/SiO$_2$ ratio, the M/SiO$_2$ ratio, the (M+Na)/SiO$_2$ ratio, the M/Na ratio, the H$_2$O/SiO$_2$ ratio, and the OH/SiO$_2$ ratio described in the present specification.

The source composition preferably contains substantially no element that requires treatment for wastewater after the crystallization. Examples of such an element include fluorine (F) and phosphorus (P).

When the source composition contains fluorine, an anti-corrosive material needs to be used for the production equipment. Therefore, the source composition preferably contains no fluorine, that is, the source composition preferably has the fluorine content of 0 ppm by weight. However, when ordinary measurement error due to composition analysis or the like is taken into account, the fluorine content of the source composition is not greater than the detection limit, is 100 ppm by weight or less, or is 10 ppm by weight or less. Due to the absence of the fluorine and the fluorine compound in the source composition, the AEI zeolite can be produced by using a facility for general purpose. Furthermore, the source composition preferably contains no phosphorus, and the phosphorus content is preferably not greater than the detection limit, more preferably 100 ppm by weight or less, or even more preferably 10 ppm by weight or less.

The fluorine content and the phosphorus content in the source composition can be measured by known measurement methods, such as ICP.

In the crystallization step, the source composition is crystallized. Examples of the crystallization method include hydrothermal synthesis. In this case, after a source composition is obtained by mixing all raw materials, such as a structure directing agent and a raw material zeolite, this is filled in a container to be sealed, and then heated.

The source composition crystallizes as long as the crystallization temperature is 100° C. or higher. The higher the temperature, the more crystallization is accelerated. Because of this, the crystallization temperature is 130° C. or higher, and preferably 160° C. or higher. The crystallization temperature does not have to be higher than necessary as long as the source composition crystallizes. Because of this, the crystallization temperature is 200° C. or lower, and preferably 180° C. or lower. Furthermore, the crystallization can be performed in either a state in which the source composition is being agitated or in a state in which it is left still.

In the production method according to an embodiment of the present invention, crystallization of the AEI zeolite can be proceeded without the use of a zeolite Y and a zeolite having D6R as an alumina silica source. For example, the crystallization of the AEI zeolite is sufficiently proceeded in 300 hours or shorter, or 250 hours or shorter. Furthermore, in the production method according to an embodiment of the present invention, the AEI zeolite can be crystallized in a shorter period of time compared to that of a known method for producing an AEI zeolite that does not use fluorine, phosphorus, or the like. Therefore, the AEI zeolite can be obtained even when the crystallization time is shorter than 80 hours, 72 hours or shorter, or 48 hours or shorter. The obtained AEI zeolite may be subjected to crushing or milling as necessary.

The production method according to an embodiment of the present invention may also include at least one of a washing step, a drying step, and an ion exchange step after the crystallization step.

In the washing step, the AEI zeolite and the liquid phase after crystallization are subjected to solid-liquid separation. In the washing step, solid-liquid separation is performed with a known method, and the obtained AEI zeolite as a solid phase needs to be washed with purified water.

In the drying step, the water content is removed from the AEI zeolite after the crystallization step or the washing step. The conditions of the drying step are discretionary, but an example thereof includes drying the AEI zeolite after the crystallization step or the washing step by leaving the zeolite to stand for at least two hours in an atmosphere at 50° C. or higher but 150° C. or lower.

The AEI zeolite after crystallization may have a metal ion such as an alkali metal ion at its ion exchange site. In the ion exchange step, this is ion-exchanged with a non-metal cation such as an ammonium ion (NH$_4^+$) or a proton (IV). Ion exchange to an ammonium ion may be performed by mixing and stirring AEI zeolite into an ammonium chloride aqueous solution. Furthermore, ion exchange to a proton may be performed by ion-exchanging AEI zeolite with ammonia and calcining it.

In the production method according to an embodiment of the present invention, the silicon and the aluminum contained in the source composition can be efficiently transformed into an AEI zeolite, and the yield of the AEI zeolite is high. In the production method according to an embodiment of the present invention, the yield of the AEI zeolite determined from the following equation is 50% or greater, 65% or greater, or 70% or greater.

$$\text{Yield(wt. \%)} = W_{Cry}/W_{Raw} \times 100$$

In the equation above, $W_{Cry}$ and $W_{Raw}$ are respectively total weights of Al and Si in the AEI zeolite and the source composition, and are each the total weight obtained from the weight obtained by converting the Al content in terms of the $Al_2O_3$ and the weight obtained by converting the Si content in terms of the $SiO_2$.

The AEI zeolite after the crystallization contains approximately from 15 to 20 wt. % of the SDA relative to the weight of the crystallized product. However, the contained SDA is removed in the case where the AEI zeolite is used in an adsorbent, a catalyst, or the like. By determining the yield by the method described above, it is possible to determine the yield of the AEI zeolite in a state where the SDA is not contained, that is, the practical yield of the AEI zeolite.

Note that, in the method for producing an AEI zeolite of Non-Patent Document 1, decrease in the yield caused together with the increase in the $SiO_2/Al_2O_3$ of the source composition is disclosed. However, in the production method according to an embodiment of the present invention, an AEI zeolite having the $SiO_2/Al_2O_3$ ratio of the source composition of 20 or greater, or 22 or greater, can be produced in a high yield of 60% or greater, or 65% or greater, in addition to the fact that an AEI zeolite having the $SiO_2/Al_2O_3$ ratio of the source composition of 100 or less can be produced in a high yield.

An AEI zeolite can be obtained by the production method according to an embodiment of the present invention. The AEI zeolite is preferably an AEI zeolite having the $SiO_2/Al_2O_3$ ratio of 100 or less, 50 or less, or 30 or less. Examples of an even more preferable $SiO_2/Al_2O_3$ ratio of the AEI zeolite obtained by the production method according to an embodiment of the present invention include from 10 to 100, from 14 to 50, and from 15 to 30.

The AEI zeolite obtained by the production method according to an embodiment of the present invention has undergone sufficient crystal growth. The average crystal size of the AEI zeolite obtained by the production method according to an embodiment of the present invention could be from 0.5 μm to 5.0 μm, from 0.5 μm to 3.0 μm, or from 0.9 μm to 3.0 μm.

The crystal size in the present invention is a primary particle size and is a diameter of a particle of an independent minimum unit observed with an electron microscope. The average crystal size is a value obtained by determining an arithmetic mean of crystal sizes of at least 30 primary particles that are randomly chosen, using an electron microscope. Therefore, the crystal size or the average crystal size differs from the secondary particle size or average secondary particle size, which is the diameter of secondary particles formed by agglomeration of a plurality of primary particles. The shape of the primary particle may be at least one selected from the group consisting of a cubic shape, a tetragonal shape, and a twin crystal shape in which cubic shapes or tetragonal shapes are composited.

The filling property of the AEI zeolite can be adjusted to a certain degree depending on the condition of the crystallization step and the treatment step after the crystallization. As the filling property of the AEI zeolite of the present invention, the aerated bulk density is from 0.1 g/cm³ to 1 g/cm³, or 0.1 g/cm³ to 0.5 g/cm³. By setting the aerated bulk density to this range, the AEI zeolite has a practical filling property as a catalyst, an adsorbent, or the like. The aerated bulk density is a bulk density at the time when the AEI zeolite that has been passed through a sieve is naturally dropped into a container to fill the container. The aerated bulk density can be measured by an ordinary measurement apparatus for physical properties of powder.

The AEI zeolite obtained by the production method according to an embodiment of the present invention has sufficient acidity as an acid catalyst. The acidity is from 0.5 mmol/g to 3 mmol/g, or 1 mmol/g to 2 mmol/g.

The acidity can be determined by subjecting a proton type AEI zeolite, from which organic materials have been removed, to ammonia TPD measurement.

In the AEI zeolite obtained by the production method according to an embodiment of the present invention, the molar ratio of the silanol amount to the silicon amount (hereinafter, also referred to as "SiOH/Si ratio") is $3 \times 10^{-2}$ or less. An ideal AEI zeolite does not contain silanol; however, practically, an AEI zeolite contains silanol. Therefore, the SiOH/Si ratio is greater than 0 but $3 \times 10^{-2}$ or less, or greater than 0 but $1 \times 10^{-2}$ or less.

The silanol amount can be determined by subjecting an ammonium type AEI zeolite, from which organic materials have been removed, to NMR measurement.

The AEI zeolite obtained by the production method according to an embodiment of the present invention preferably has high heat resistance, reduces the reduction in crystallinity between before and after exposure to a steam atmosphere, and reduces the reduction in crystallinity between before and after exposure to a steam atmosphere compared to a known AEI zeolite obtained by using a zeolite Y as a raw material. The degree of reduction in the crystallinity due to exposure to a steam atmosphere can be indicated by the proportion of crystallinity after the exposure to the steam atmosphere relative to the crystallinity before the exposure to the steam atmosphere (hereinafter, also referred to as "maintenance ratio of crystallinity"). This can be determined by comparing the intensities of XRD peaks between before and after the exposure to the steam atmosphere.

The AEI zeolite obtained by the production method according to an embodiment of the present invention can be used as a catalyst support or an adsorbent. Furthermore, by allowing the AEI zeolite obtained by the production method according to an embodiment of the present invention to contain at least one selected from the group consisting of copper and iron, it is expected that the AEI zeolite can be used as a catalyst or a nitrogen oxide reduction catalyst.

EXAMPLES

The present invention will be described below using examples. However, the present invention is not limited to these examples. Note that "ratio" denotes "molar ratio" unless otherwise noted.

Identification of Crystal Phase

The XRD pattern of a sample was measured using a general X-ray diffraction apparatus (instrument name: Ultima IV, available from Rigaku Corporation). Using a CuKα beam (λ: 1.5405 Å) as a radiation source, the measurement was performed in the measurement range of 2θ from 3° to 43°.

The identification of the sample structure was performed by comparing the obtained XRD pattern with an XRD pattern of Table 1 of Patent Document 1.

Composition Analysis

A sample solution was prepared by dissolving a sample in a mixed aqueous solution of hydrofluoric acid and nitric acid. Using a general ICP instrument (instrument name: OPTIMA 5300DV, available from PerkinElmer Inc.), the sample solution was measured by inductively coupled plasma atomic emission spectroscopy (ICP-AES). The $SiO_2/Al_2O_3$ ratio of the sample was determined from the obtained measured values of Si and Al.

Silanol Amount

The content of the silanol was measured by 1H MAS NMR after the synthesized AEI zeolite is calcined in the air at 600° C. for 2 hours. The conditions were as follows. Prior to measurements, the sample was dehydrated as a form of pretreatment by holding the sample for five hours at 400° C. in vacuum exhaust. After pretreatment, the sample that was cooled to room temperature was collected and weighed in a nitrogen atmosphere. A typical NMR instrument (instrument name: VXR-300S, available from Varian) was used as the measurement device.

Resonance frequency: 300.0 MHz
Pulse width: π/2
Measurement waiting time: 10 seconds
Integration frequency: 32 times
Rotational frequency: 4 kHz
Shift reference: TMS The peak assigned to the silanol group (peak in 2.0±0.5 ppm) was subjected to waveform separation, and the integrated intensity thereof was determined from the obtained 1H MAS NMR spectrum. The silanol amount in the sample was determined by a calibration curve method from the resulting integrated intensity.

Acidity

After the synthesized AEI zeolite was calcined in the air at 600° C. for 2 hours, the measurement was performed by the ammonia Temperature Programmed Desorption (TPD) method by using the BELCAT II, available from Microtrac-BEL Corp. Prior to the measurement, 0.05 g of an AEI zeolite was heat-treated at 500° C. in helium to remove adsorptive components, and then subjected to saturated adsorption of ammonia by contacting a flow of mixed gas of 99% helium and 1% ammonia at 100° C. Then, the ammonia remaining in the system was removed by flowing helium gas. After the removal of the ammonia, the amount of the ammonia released from the sample when the treatment was performed in the following conditions was quantitated to determine the acidity.

Atmosphere: in helium flow (flow rate: 30 mL/min)
Rate of temperature increase: 10° C./min
Treatment temperature: from 100° C. to 700° C.

Average Crystal Size

The crystal size and shape of the primary particles were observed with an electron microscope (instrument name: JSM-6390LV, available from Hitachi Bunko). When the primary particle was a crystal having a cubic shape, the crystal size was determined by measuring the length of one side of the crystal, and when the primary particle was a tetragonal shape, the crystal size was determined by measuring the length of a side of a face of the square. The average crystal size was determined by randomly choosing at least 30 primary particles and then calculating the average of the measured values of the particle sizes.

Maintenance Ratio of Crystallinity

XRD measurement for the AEI zeolite sample before and after the hydrothermal durability treatment, was performed by a method similar to that of the identification of the crystal structure. After the obtained XRD pattern was subjected to background subtraction treatment and peak search treatment, the peak intensities of the XRD peaks that correspond to 2θ=16.9±0.2° and 17.2±0.2° were summed up, and the total value was used as the crystallinity of the AEI zeolite sample. The maintenance ratio of crystallinity was calculated by using the following equation.

Maintenance ratio of crystallinity (%)=(crystallinity after hydrothermal durability treatment)/(crystallinity before hydrothermal durability treatment)×100

Aerated Bulk Density

The aerated bulk density was measured by measuring a bulk density at the time when the powder sample was passed through a sieve and naturally dropped into a container to fill the container. A measurement instrument for physical properties of powder (instrument name: MULTI TESTER MT-1001, available from Seishin Enterprise Co., Ltd.) was used for the measurement.

Example 1

A source composition formed from the composition shown below was obtained by mixing pure water, sodium hydroxide, potassium hydroxide, an FER zeolite ($SiO_2/Al_2O_3$ ratio: 24, $H^+$ type) as a raw material zeolite, 1,1,3,5-tetramethylpiperidinium hydroxide (hereinafter, also referred to as "TMPOH"), and an AEI zeolite ($SiO_2/Al_2O_3$ ratio: 16, H type) as a seed crystal zeolite.

$SiO_2/Al_2O_3$ ratio: 24
$Na/SiO_2$ ratio: 0.05
$K/SiO_2$ ratio: 0.05
$(K+Na)/SiO_2$ ratio: 0.1
K/Na ratio: 1.0
$TMPOH/SiO_2$ ratio: 0.2
$H_2O/SiO_2$ ratio: 10
$OH/SiO_2$ ratio: 0.30

The content of the raw material zeolite in the source composition was 95 wt. %, and the content of the seed crystal zeolite was 5 wt. %.

The source composition was filled in a container and then the container was tightly closed, and the source composition was crystallized at 170° C. for 48 hours while being agitated. The obtained crystallized product was subjected to solid-liquid separation and washed with pure water, and then dried at 110° C. As a result of the XRD measurement, this crystallized product was an AEI zeolite, the $SiO_2/Al_2O_3$ ratio thereof was 18, the yield was 77%, and the average crystal size was 0.5 μm.

Example 2

A crystallized product was obtained by the same method as for Example 1 except for obtaining a source composition having the composition shown below by mixing pure water, sodium hydroxide, potassium hydroxide, an FER zeolite ($SiO_2/Al_2O_3$ ratio: 17, $H^+$ type) as the raw material zeolite, TMPOH, an AEI zeolite ($SiO_2/Al_2O_3$ ratio: 16, H type; average particle size: 3.1 μm) as the seed crystal zeolite, and amorphous aluminosilicate having the $SiO_2/Al_2O_3$ ratio of 39.

$SiO_2/Al_2O_3$ ratio: 26
$Na/SiO_2$ ratio: 0.12
$K/SiO_2$ ratio: 0.04
$(K+Na)/SiO_2$ ratio: 0.16
K/Na ratio: 0.33

TMPOH/SiO$_2$ ratio: 0.2
H$_2$O/SiO$_2$ ratio: 10
OH/SiO$_2$ ratio: 0.36

The content of the raw material zeolite in the source composition was 36 wt. % (35.7 wt. %), and the content of the seed crystal zeolite was 5 wt. % (4.8 wt. %). Furthermore, the content of the amorphous aluminosilicate was 60 wt. % (59.5 wt. %). The obtained crystallized product was an AEI zeolite, the SiO$_2$/Al$_2$O$_3$ ratio thereof was 18, and the yield was 71%.

Example 3

A crystallized product was obtained by the same method as for Example 1 except for using an FER zeolite having the SiO$_2$/Al$_2$O$_3$ ratio of 25 (H$^+$ type) as the raw material zeolite, using a source composition having the composition shown below, and changing the crystallization time to 72 hours.
SiO$_2$/Al$_2$O$_3$ ratio: 24
Na/SiO$_2$ ratio: 0.12
K/SiO$_2$ ratio: 0.04
(K+Na)/SiO$_2$ ratio: 0.16
K/Na ratio: 0.33
TMPOH/SiO$_2$ ratio: 0.2
H$_2$O/SiO$_2$ ratio: 13
OH/SiO$_2$ ratio: 0.36

The content of the raw material zeolite in the source composition was 90 wt. %, and the content of the seed crystal zeolite was 10 wt. %. The obtained crystallized product was an AEI zeolite, the SiO$_2$/Al$_2$O$_3$ ratio thereof was 16, and the yield was 69%.

Example 4

A crystallized product was obtained by the same method as for Example 2 except for using a source composition having the following composition.
SiO$_2$/Al$_2$O$_3$ ratio: 26
Na/SiO$_2$ ratio: 0.14
K/SiO$_2$ ratio: 0.04
(K+Na)/SiO$_2$ ratio: 0.18
K/Na ratio: 0.29
TMPOH/SiO$_2$ ratio: 0.17
H$_2$O/SiO$_2$ ratio: 10
OH/SiO$_2$ ratio: 0.35

The content of the raw material zeolite in the source composition was 41 wt. %, and the content of the seed crystal zeolite was 1 wt. %. Furthermore, the content of the amorphous aluminosilicate was 58 wt. %. The obtained crystallized product was an AEI zeolite, and the average crystal size was 0.8 μm.

Example 5

A crystallized product was obtained by the same method as for Example 2 except for using a source composition having the following composition.
SiO$_2$/Al$_2$O$_3$ ratio: 26
Na/SiO$_2$ ratio: 0.16
K/SiO$_2$ ratio: 0.04
(K+Na)/SiO$_2$ ratio: 0.20
K/Na ratio: 0.25
TMPOH/SiO$_2$ ratio: 0.15
H$_2$O/SiO$_2$ ratio: 10
OH/SiO$_2$ ratio: 0.35

The content of the raw material zeolite in the source composition was 39 wt. %, and the content of the seed crystal zeolite was 5 wt. %. Furthermore, the content of the amorphous aluminosilicate was 56 wt. %. The obtained crystallized product was an AEI zeolite, and the average crystal size was 0.5 μm.

Example 6

A crystallized product was obtained by the same method as for Example 2 except for using an FER zeolite (SiO$_2$/Al$_2$O$_3$ ratio: 19, H$^+$ type) as the raw material zeolite, using a CHA zeolite (SiO$_2$/Al$_2$O$_3$ ratio: 20; average particle size: 1.3 μm) as the seed crystal zeolite, using amorphous aluminosilicate having the SiO$_2$/Al$_2$O$_3$ ratio of 42, and using a source composition having the following composition.
SiO$_2$/Al$_2$O$_3$ ratio: 26
Na/SiO$_2$ ratio: 0.16
K/SiO$_2$ ratio: 0.04
(K+Na)/SiO$_2$ ratio: 0.20
K/Na ratio: 0.25
TMPOH/SiO$_2$ ratio: 0.15
H$_2$O/SiO$_2$ ratio: 10
OH/SiO$_2$ ratio: 0.35

The content of the raw material zeolite in the source composition was 47 wt. %, and the content of the seed crystal zeolite was 1 wt. %. Furthermore, the content of the amorphous aluminosilicate was 52 wt. %. The obtained crystallized product was an AEI zeolite.

In the AEI zeolite of the present example, the SiO$_2$/Al$_2$O$_3$ ratio was 17, the yield was 68%, the average crystal size was 1.7 μm, the silanol amount was SiOH/Si ratio=0.9×10$^{-2}$, and the acidity was 1.72 mmol/g.

In the present example, the time required for the completion of the crystallization (time required until the XRD pattern derived from the raw material zeolite disappeared) was 48 hours.

Example 7

A crystallized product was obtained by the same method as for Example 6 except for using an FER zeolite (SiO$_2$/Al$_2$O$_3$ ratio: 18, H$^+$ type) as the raw material zeolite, using amorphous aluminosilicate having the SiO$_2$/Al$_2$O$_3$ ratio of 47, changing the crystallization time to 36 hours, and using a source composition having the following composition.
SiO$_2$/Al$_2$O$_3$ ratio: 27
Na/SiO$_2$ ratio: 0.18
K/SiO$_2$ ratio: 0.02
(K+Na)/SiO$_2$ ratio: 0.20
K/Na ratio: 0.11
TMPOH/SiO$_2$ ratio: 0.15
H$_2$O/SiO$_2$ ratio: 11
OH/SiO$_2$ ratio: 0.35

The content of the raw material zeolite in the source composition was 46.3 wt. %, and the content of the seed crystal zeolite was 0.1 wt. %. Furthermore, the content of the amorphous aluminosilicate was 53.6 wt. %. In the present example, the XRD pattern derived from the raw material zeolite disappeared in 34 hours after the start of the crystallization, and it was confirmed that the crystallization of the AEI zeolite completed in 34 hours. In the present example, it was possible to obtain the AEI zeolite in a form of a single phase in a shorter period of crystallization time compared to the case of Example 6 even though the content of the seed crystal zeolite was less.

The obtained crystallized product was an AEI zeolite, the SiO$_2$/Al$_2$O$_3$ ratio thereof was 18, the yield was 69%, the average crystal size was 1.6 μm, the silanol amount was SiOH/Si ratio=$0.6\times10^{-2}$, the acidity was 1.72 mmol/g, and the aerated bulk density was 0.35 g/mL.

Example 8

A crystallized product was obtained by the same method as for Example 3 except for using an MOR zeolite ($SiO_2$/$Al_2O_3$ ratio: 25, $H^+$ type) as the raw material zeolite. As a result of the XRD measurement, the intensity of the XRD peak assigned to the AEI zeolite in the obtained crystallized product was two times or greater compared to the intensity before the crystallization. Furthermore, as a result of SEM observation, it was confirmed that particles having shapes that are different from the shapes of the seed crystal zeolite and the raw material zeolite were present in the crystallized product. Because of this, it was confirmed that the crystallization from the source composition containing the MOR zeolite to the AEI zeolite was proceeded.

The crystallization was continued and the reaction was terminated at the time when the total crystallization time from the start of the crystallization became 240 hours, and thus the crystallized product was obtained. The obtained crystallized product was subjected to solid-liquid separation and washed with pure water, and then dried at 110° C. The obtained crystallized product was an AEI zeolite.

Comparative Example 1

The crystallization was performed by the same method as for Example 3 except for using an MFI zeolite ($SiO_2$/$Al_2O_3$ ratio: 25, $H^+$ type; framework density: 18.4 T/1000 $Å^3$) in place of the FER zeolite. The obtained solid was washed and dried. As a result of the XRD measurement, this crystallized product was a mixture of an MFI zeolite and an AEI zeolite.

As a result of SEM observation, only the particles having the same shape as the AEI zeolite added as the seed crystal zeolite were observed in the obtained crystallized product, and the intensity of the XRD peak corresponding to the AEI zeolite did not change between before and after the crystallization. Because of this, in the present comparative example, it was confirmed that, when the MFI zeolite was used as the raw material, the crystal growth of the AEI zeolite did not proceed at all, in addition to the fact that it was not possible to obtain any AEI zeolite in a form of a single phase.

Comparative Example 2

The crystallization was performed by the same method as for Example 3 except for using a *BEA zeolite ($SiO_2$/$Al_2O_3$ ratio: 25, $H^+$ type; framework density: 15.3 T/1000 $Å^3$) in place of the FER zeolite. The obtained solid was washed and dried. As a result of the XRD measurement, this crystallized product was a mixture of a *BEA zeolite and an AEI zeolite.

As a result of SEM observation, only the particles having the same shape as the AEI zeolite added as the seed crystal zeolite were observed in the obtained crystallized product, and the intensity of the XRD peak corresponding to the AEI zeolite did not change between before and after the crystallization. Because of this, in the present comparative example, it was confirmed that, when the *BEA zeolite was used as the raw material, the crystal growth of the AEI zeolite did not proceed at all, in addition to the fact that it was not possible to obtain any AEI zeolite in a form of a single phase.

Comparative Example 3

A crystallized product was obtained by the same method as for Example 2 except for using an OFF zeolite ($SiO_2$/$Al_2O_3$ ratio: 10, $H^+$ type; framework density: 16.1 T/1000 $Å^3$) as the raw material zeolite, using amorphous aluminosilicate having the $SiO_2$/$Al_2O_3$ ratio of 400, and using a source composition having the following composition.

$SiO_2$/$Al_2O_3$ ratio: 20
Na/$SiO_2$ ratio: 0.12
K/$SiO_2$ ratio: 0.01
(K+Na)/$SiO_2$ ratio: 0.13
K/Na ratio: 0.08
TMPOH/$SiO_2$ ratio: 0.20
$H_2O$/$SiO_2$ ratio: 10
OH/$SiO_2$ ratio: 0.33

The content of the raw material zeolite in the source composition was 49 wt. %, and the content of the seed crystal zeolite was 10 wt. %. Furthermore, the content of the amorphous aluminosilicate was 41 wt. %.

As a result of SEM observation, only the particles having the same shape as the AEI zeolite added as the seed crystal zeolite were observed in the obtained crystallized product, and the intensity of the XRD peak corresponding to the AEI zeolite did not change between before and after the crystallization. Because of this, in the present comparative example, it was confirmed that, when the OFF zeolite was used as the raw material, the crystal growth of the AEI zeolite did not proceed at all, in addition to the fact that it was not possible to obtain any AEI zeolite in a form of a single phase.

Measurement Example

Each of the AEI zeolites obtained in Examples 6 and 7 was calcined in the air at 600° C. for 2 hours to transform the AEI zeolite into a proton type. The AEI zeolite after the transformation was subjected to hydrothermal durability treatment in the following conditions, and the maintenance ratio of crystallinity was measured.

Treatment temperature: 900° C.
Treatment time: 4 hours
Treatment atmosphere: in air flow containing moisture (water: 10 vol. %; air: 90 vol. %)
Rate of temperature increase: 20° C./min
Atmosphere during temperature increase: in the air flow when the temperature is from the room temperature to 200° C., and in the air flow containing moisture when the temperature exceeds 200° C.

Furthermore, for comparison, an AEI zeolite was produced by a structural transformation of a zeolite Y (hereinafter, also referred to as "comparative sample"). Note that, in the production of the comparative sample, the crystallization of the AEI zeolite required 72 hours. Because of this, it was suggested that the production cost can be reduced due to the shortened crystallization time as well as the fact that the cost for raw materials can be reduced in the production method according to an embodiment of the present invention compared to a method for producing an AEI zeolite by inducing a structural transformation of a zeolite Y.

The comparative sample was subjected to hydrothermal durability treatment in the conditions described above to measure maintenance ratio of crystallinity. The results of the maintenance ratio of crystallinity are shown in Table 4.

TABLE 4

|  | Maintenance ratio of crystallinity (%) |
| --- | --- |
| Example 6 | 100 |
| Example 7 | 100 |
| Comparative sample | 49 |

Table 4 shows that the maintenance ratio of crystallinity of the AEI zeolite obtained by the production method according to an embodiment of the present invention after the hydrothermal durability treatment was high, and the crystal was more stable compared to the AEI zeolite obtained by inducing a transformation of zeolite Y. Furthermore, with the AEI zeolite obtained by the production method according to an embodiment of the present invention, no change was observed in the crystallinities between before and after the hydrothermal durability treatment at 900° C. for 4 hours, and it was confirmed that the AEI zeolite had significantly high durability.

INDUSTRIAL APPLICABILITY

The production method according to an embodiment of the present invention can be used as a method for producing an AEI zeolite, especially as an industrial method for producing an AEI zeolite. Furthermore, the production method can be used as an industrial method for producing an AEI zeolite that is suitable as a support for catalyst or the like and that has the $SiO_2/Al_2O_3$ ratio of 100 or less.

All of the content of the specification, scope of patent claims, and abstract of JP 2015-171744 filed on Sep. 1, 2015 is cited here and incorporated as a disclosure of the specification of the present invention.

The invention claimed is:

1. A method for producing an AEI zeolite, the method comprising crystallizing a composition containing a structure directing agent, a sodium source, water, and a zeolite having at least one structure selected from the group consisting of FER and MOR according to the IUPAC structure code prescribed by the Structure Commission of the International Zeolite Association, as a silica alumina source;
    wherein the structure directing agent is configured to direct the AEI zeolite.

2. The method according to claim 1, wherein a molar ratio of silica to alumina of the composition is from 10 to 100.

3. The method according to claim 1, wherein the structure directing agent is at least one selected from the group consisting of 1,1,3,5-tetramethylpiperidinium cation, 1,1-diethyl-2,6-dimethylpiperidinium cation, 1,1,2,6-tetramethylpiperidinium cation, 1-ethyl-1,2,6-trimethylpiperidinium cation, and 1,1,2-triethylpiperidinium cation.

4. The method according to claim 1, wherein the composition contains at least one selected from the group consisting of aluminum hydroxide, aluminum oxide, aluminum sulfate, aluminum chloride, aluminum nitrate, amorphous aluminosilicate, metallic aluminum, and aluminum alkoxide.

5. The method according to claim 1, wherein the composition contains an amorphous aluminosilicate having a molar ratio of silica to alumina of 1.4 to 2000.

6. The method according to claim 1, wherein the composition additionally contains at least one selected from the group consisting of an AEI zeolite, a CHA zeolite, an OFF zeolite, an ERI zeolite, a KFI zeolite, an AFX zeolite, an AFT zeolite, an EAB zeolite, a GME zeolite, and an LEV zeolite.

7. The method according to claim 1, wherein a molar ratio of silica to alumina of the source composition is from 15 to 50.

8. The method according to claim 1, wherein the composition has a molar composition described below, wherein M is an alkali metal except sodium and SDA is an organic structure directing agent:
    $SiO_2/Al_2O_3$ ratio: from 20 to 50;
    $Na/SiO_2$ ratio: from 0.05 to 0.3;
    $M/SiO_2$ ratio: from 0 to 0.5;
    $SDA/SiO_2$ ratio: from 0.1 to 0.3;
    $OH/SiO_2$ ratio: from 0.1 to 0.45; and
    $H_2O/SiO_2$ ratio: 3 or greater but less than 20.

9. The production method according to claim 1, wherein a fluorine content in the composition is 100 ppm by weight or less.

10. The method according to claim 1, wherein an AEI zeolite having a molar ratio of silica to alumina of 100 or less is obtained in the crystallization step.

11. A method for producing an AEI zeolite, the method comprising crystallizing a composition comprising:
    a structure directing agent selected from the group consisting of 1,1,3,5-tetramethylpiperidinium cation, 1,1-diethyl-2,6-dimethylpiperidinium cation, 1,1,2,6-tetramethylpiperidinium cation, 1-ethyl-1,2,6-trimethylpiperidinium cation, and 1,1,2-triethylpiperidinium cation;
    a sodium source;
    water; and
    a zeolite having at least one structure selected from the group consisting FER and MOR wherein M is an alkali metal except sodium and an organic structure directing agent (SDA) including:
    $SiO_2/Al_2O_3$ ratio: from 20 to 50;
    $Na/SiO_2$ ratio: from 0.05 to 0.3;
    $M/SiO_2$ ratio: from 0 to 0.5;
    $SDA/SiO_2$ ratio: from 0.1 to 0.3;
    $OH/SiO_2$ ratio: from 0.1 to 0.45; and
    $H_2O/SiO_2$ ratio: 3 or greater but less than 20.

12. A method for producing an AEI zeolite, the method comprising crystallizing a composition containing a structure directing agent, a sodium source, water, and a zeolite having at least one structure selected from the group consisting of FER, HEU and MOR, according to the IUPAC structure code prescribed by the Structure Commission of the International Zeolite Association, as a silica alumina source; wherein:
    the structure directing agent is configured to direct the AEI zeolite;
    a molar ratio of silica to alumina of the composition is 10 to 100;
    a molar ratio of sodium to silica of the composition is 0.01 to 1.0;
    a molar ratio of alkali metal except sodium to the silica of the composition is 0 to 0.5;
    a molar ratio of the alkali metal except sodium to the sodium of the composition is 0 to 2.0;
    a molar ratio of the structure directing agent to the silica of the composition is 0.05 to 0.40;
    a molar ratio of hydroxide ion to the silica of the composition is 0.5 or less; and
    a molar ratio of water to silica of the composition is 3 to 50.

* * * * *

UNITED STATES PATENT AND TRADEMARK OFFICE
CERTIFICATE OF CORRECTION

PATENT NO. : 10,556,802 B2
APPLICATION NO. : 15/752460
DATED : February 11, 2020
INVENTOR(S) : Y. Takamitsu et al.

It is certified that error appears in the above-identified patent and that said Letters Patent is hereby corrected as shown below:

In the Claims

Column 22, Line 28 Claim 11, insert --of-- between "consisting" and "FER".

Signed and Sealed this
Eighth Day of September, 2020

Andrei Iancu
*Director of the United States Patent and Trademark Office*